(12) United States Patent
Saito

(10) Patent No.: US 8,982,373 B2
(45) Date of Patent: Mar. 17, 2015

(54) INFORMATION PROCESSING DEVICE, METHOD, AND STORAGE MEDIUM

(71) Applicant: Canon Kabushiki Kaisha, Tokyo (JP)

(72) Inventor: Kazuyuki Saito, Lake Success, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/073,136

(22) Filed: Nov. 6, 2013

(65) Prior Publication Data

US 2014/0139859 A1     May 22, 2014

(30) Foreign Application Priority Data

Nov. 16, 2012  (JP) ................................. 2012-252384

(51) Int. Cl.
*G06F 3/12*  (2006.01)
*H04N 1/00*  (2006.01)
*G06K 15/00* (2006.01)

(52) U.S. Cl.
CPC .......... *H04N 1/00204* (2013.01); *G06F 3/1204* (2013.01); *G06F 3/1224* (2013.01); *G06F 3/1285* (2013.01); *H04N 1/00206* (2013.01); *H04N 1/00233* (2013.01); *H04N 2201/0075* (2013.01); *H04N 2201/0094* (2013.01)

USPC .................... 358/1.13; 358/1.15; 358/1.18

(58) Field of Classification Search
CPC ..................................................... G06F 3/1224
USPC ......................................................... 358/1.13
See application file for complete search history.

(56) References Cited

U.S. PATENT DOCUMENTS

2004/0239988 A1  12/2004  Kato
2007/0008567 A1*  1/2007  Choi ........................... 358/1.13

FOREIGN PATENT DOCUMENTS

JP         2003022170 A       1/2003

* cited by examiner

*Primary Examiner* — Dov Popovici
(74) *Attorney, Agent, or Firm* — Fitzpatrick, Cella, Harper & Scinto

(57) ABSTRACT

A computer-implemented method is provided that includes creating a virtual device object when an application accepts an instruction for creating the virtual device object by using a driver corresponding to an image processing device by a user; displaying the created virtual device object; extracting the driver selected in the instruction registering so as to register the driver with the virtual device object; and outputting a file by using the driver which the registering has registered with the virtual device object when the user selects the virtual device object by using the file.

19 Claims, 16 Drawing Sheets

FIG. 3

Printer setting    300    X

| Printer selection: | Printer-A ▼ |
|---|---|
| Device status display: | ON ▼ |
| Use of designated template setting when printing: | ON ▼ |
| Icon button name: Button-P1 | File name: image-P1 |
| Annotation printing: | ON ▼ |
| Use a paper approximate to a document size when printing: | ON ▼ |

[ OK ] [ Cancel ]

Fax setting    301    X

| Fax selection: | FAX-A ▼ |
|---|---|
| Batch transmission of selected documents | ON ▼ |
| Confirmation of a preview when faxing | ON ▼ |
| Icon button name: Button-F1 | File name: image-F1 |
| Cover sheet attachment | ON ▼ |
| Storage of fax transmission image | ON ▼ |

Fax transmission destination:
- Automatic acquiring of fax number from document when faxing   OFF ▼
- Acquiring and designating transmission destination fax number from address book of fax driver   OFF ▼
- Acquiring and designating transmission destination fax number from address book of device   ON ▼

| Fax a document with annotation | ON ▼ |
|---|---|
| Use a paper approximate to a document size when faxing | ON ▼ |
| Designate external originating number | OFF ▼ |
| Transmission time: | pm 5:00 |

[ OK ] [ Cancel ]

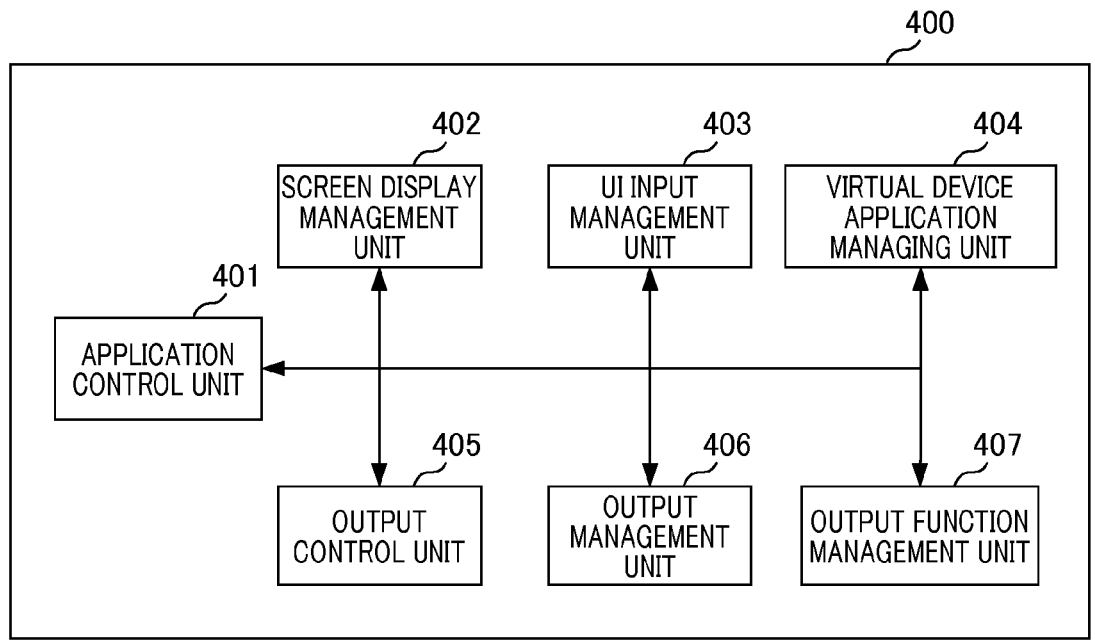
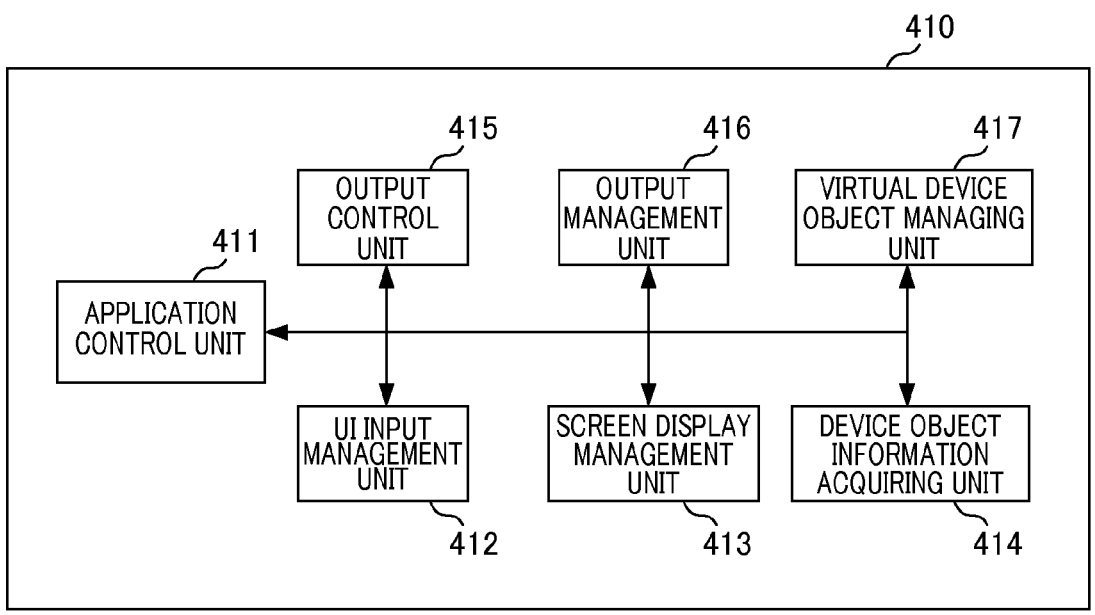

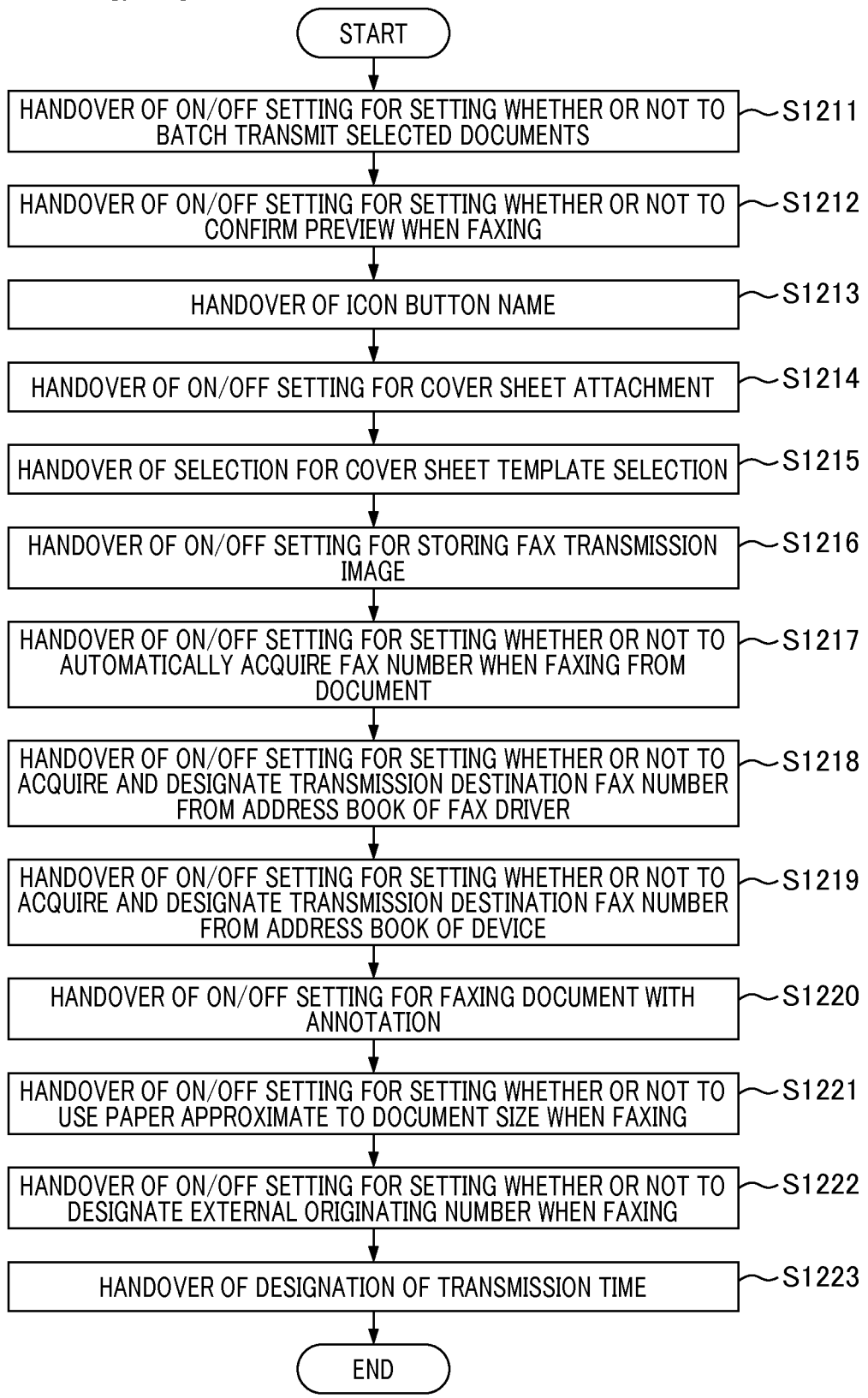

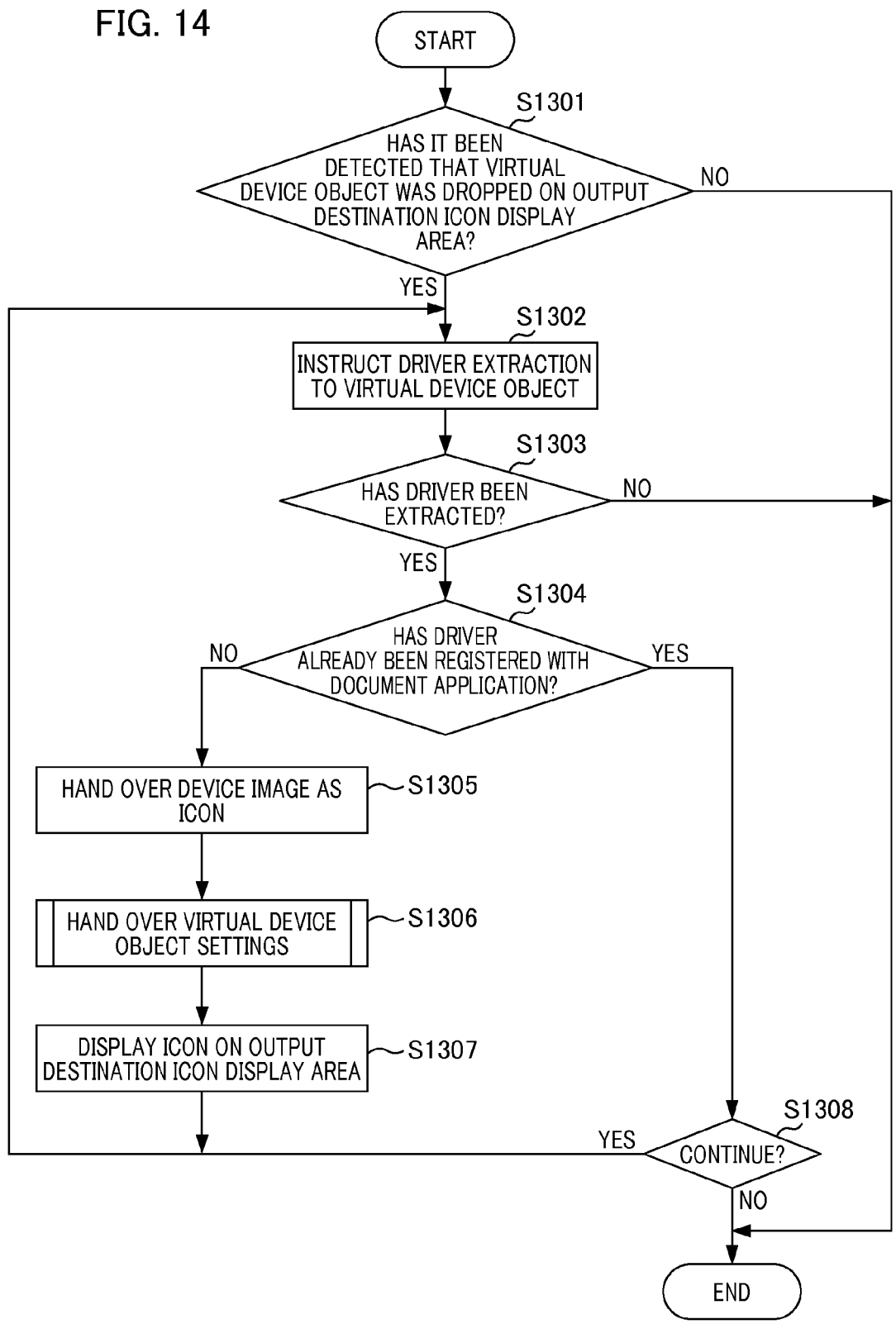

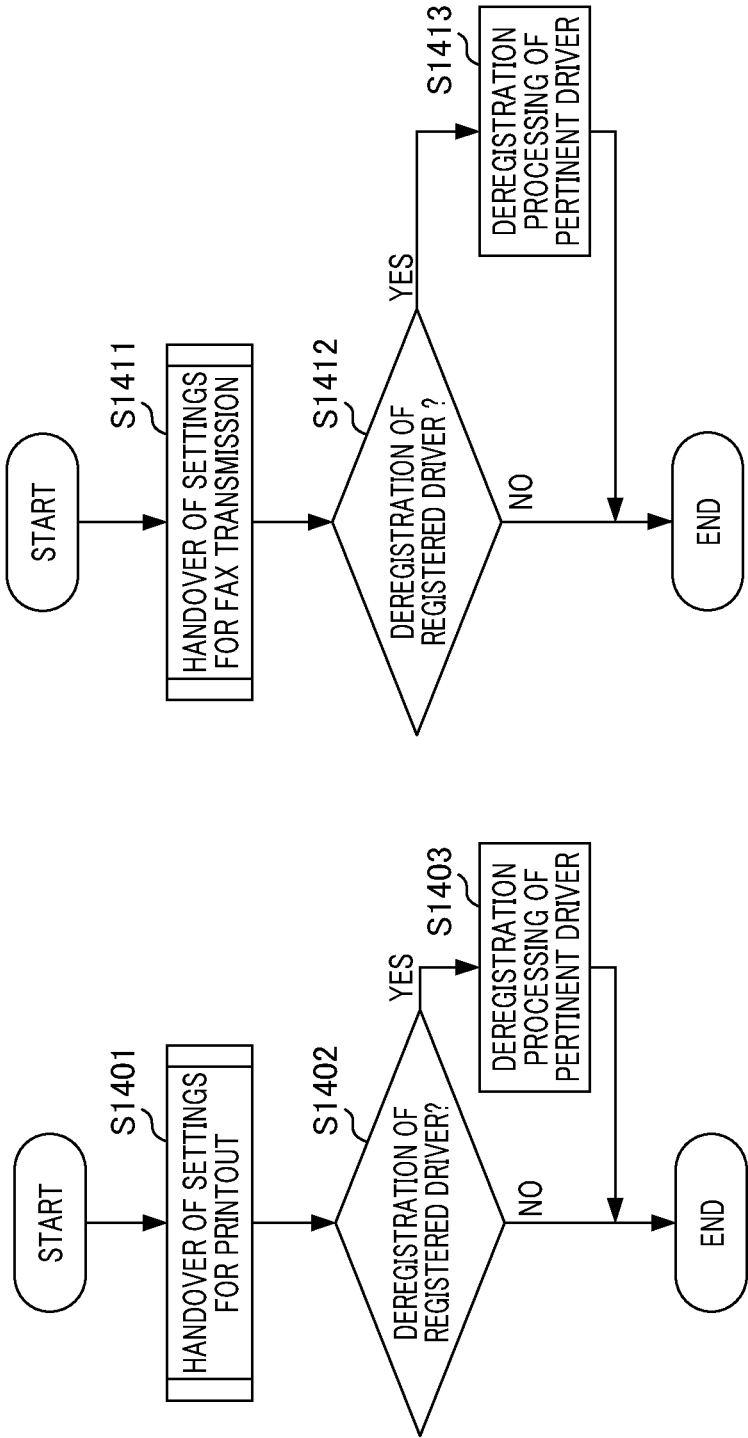

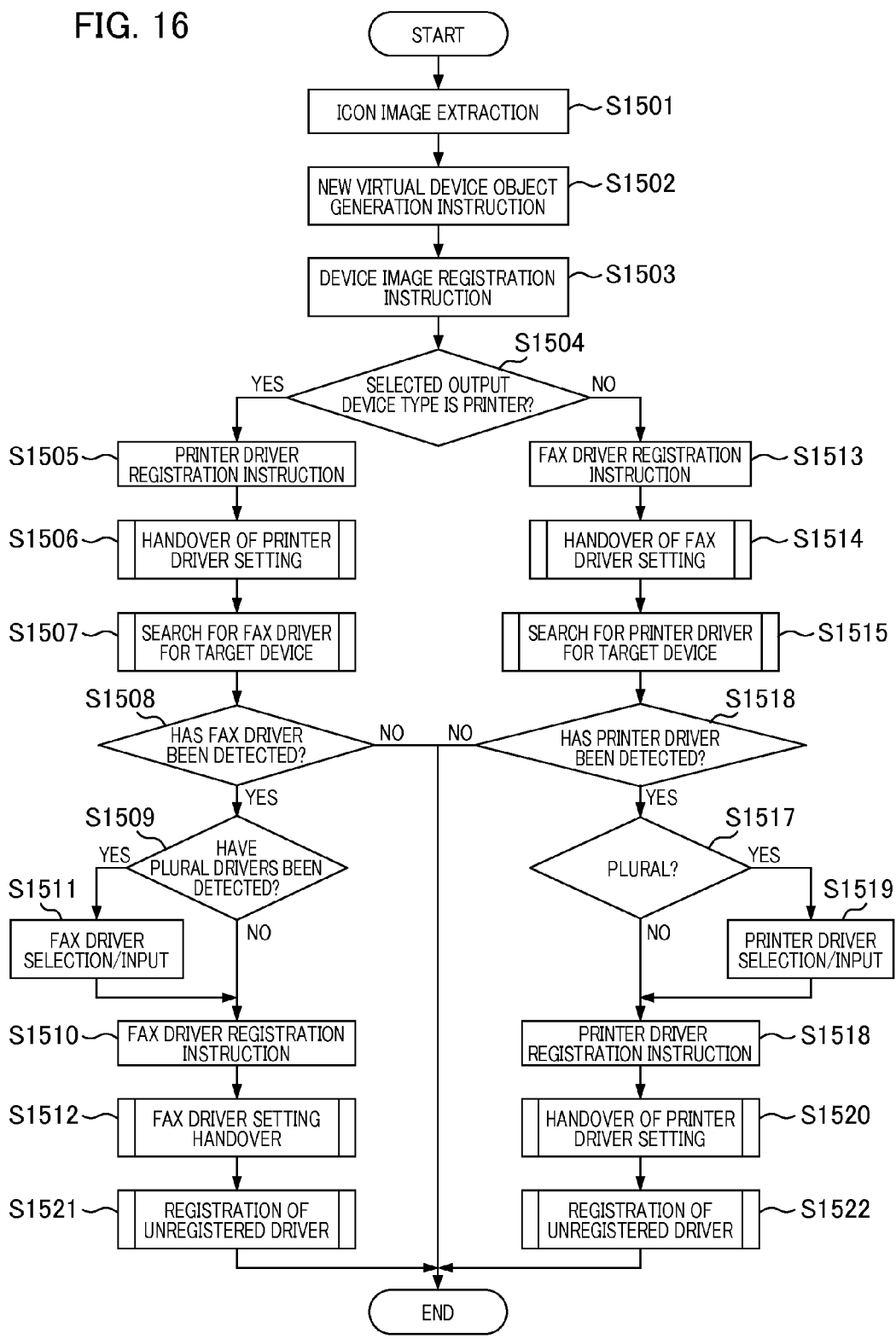

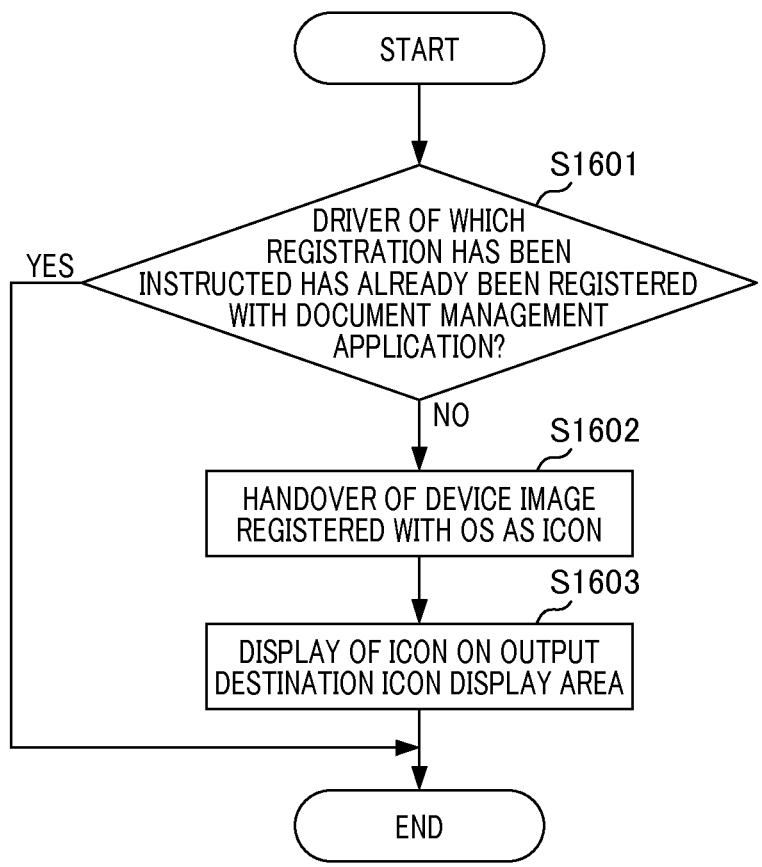

INFORMATION PROCESSING DEVICE, METHOD, AND STORAGE MEDIUM

BACKGROUND OF THE INVENTION

1. Field of the Invention

The present invention relates to an information processing device, a method, and a storage medium.

2. Description of the Related Art

When a user instructs a multifunctional device, such as a printer and a facsimile device, to output from an information processing device such as a PC, the user opens a document to be output on a screen provided in information processing device by using an application. A user generally orders a printout of a document via a printer driver. Recent multifunctional devices include various functions such as printing, a faxing, and scanning. Generally, a user uses an appropriate driver depending on such functions since there are various drivers depending on the functions. For example, a user uses a printer driver in the case of printing and a fax driver in the case of faxing. A technique for integrating a plurality of drivers as a virtual device application is proposed for enhancing convenience for document output to the multifunctional device.

For example, Japanese Patent Application Laid-Open No. 2003-22170 discloses a dispersion control device that realizes a function that performs printing by using a virtual dispersion printer in which a plurality of print devices connected to a network cooperate.

However, when the dispersion control device disclosed in Japanese Patent Application Laid-Open No. 2003-22170 is used, a user is required for the work of individually registering printer drivers corresponding to the plurality of print devices with the virtual dispersion device. In addition, there is no description in Japanese Patent Application Laid-Open No. 2003-22170 with about the creation of the virtual dispersion device by the handover of the driver such as the printer driver from an application.

Here an environment is assumed where a first application is acceptable for selection of a driver from a user, and a second application manages a virtual device object with which some drivers can be registered. Since such an environment is not considered in Japanese Patent Application Laid-Open No. 2003-22170, there is likely a case where a user has to separately perform selection of a driver from the first application and registration of the driver with the virtual device object.

SUMMARY OF THE INVENTION

The present invention provides a technique with which a driver can be registered with a virtual device object managed by a second application by selecting the driver with a first application.

An embodiment of computer-implemented method according to the present invention for the above technique is provided that includes creating a virtual device object when an application accepts an instruction for creating the virtual device object by using a driver corresponding to an image processing device by a user; displaying the created virtual device object; extracting the driver selected in the instruction registering so as to register the driver with the virtual device object; and outputting a file by using the driver which the registering has registered with the virtual device object when the user selects the virtual device object by using the file.

Further features of the present invention will become apparent from the following description of exemplary embodiments with reference to the attached drawings.

BRIEF DESCRIPTION OF THE DRAWINGS

FIG. 3 is a view that shows an example of a UI display for setting output functions.

FIG. 4A and FIG. 4Ba are views that show an example of a software configuration of an information processing device.

FIG. 13 is a flow diagram indicating processing for handing over fax driver settings.

FIG. 14 is a flow diagram indicating processing for automatically registering a driver with a document management application.

FIG. 15 is a flow diagram indicating deregistration processing of functions from a document management application.

FIG. 16 is a flow diagram indicating processing for newly generating a virtual device object.

FIG. 17 is a flow diagram indicating processing for registering unregistered drivers.

DESCRIPTION OF THE EMBODIMENTS

<System Configuration>

Figure 1:
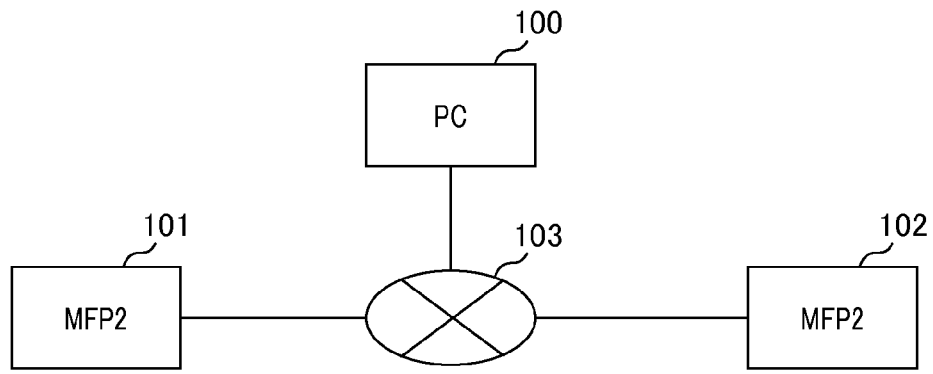
FIG. 1 is a view that shows a configuration of an information processing system of the present embodiment.

FIG. 1 shows a configuration of an information processing system of an embodiment according to the present invention. The information processing system shown in FIG. 1 includes an information processing device such as a PC and a multifunctional device such as a printer and a facsimile device, and each device is communicable via a network. The PC is used by a user, and is an abbreviation for "Personal Computer". The information processing device 100 shown in FIG. 1 provides instructions for printing and fax transmission to the multifunctional device (an MFP 101 and an MFP 102). MFP is abbreviation for "Multifunction Peripheral". The MFP 101 and the MFP 102 are the multifunction devices and include a printer function, a fax function, a copy function, a scanner function, a file transmission function, and the like.

A predetermined operation system (OS) and various applications that execute specific function processing are installed on the information processing device 100. Here, the specific function processing includes document processing, spreadsheet processing, presentation processing, image processing, graphic processing, and the like, and each application has respectively unique data structures (file structure). In addition, the OS has a configuration in which a print instruction can be made to a corresponding application with reference to an identifier of each file.

Also, a document management application 400 for managing document files and a virtual device application 410 for using the multifunctional device are installed on the information processing device 100 of the present embodiment. The details of the document management application 400 and the virtual device application 410 will be given below in FIG. 4A and FIG. 4B. The reference numeral 103 indicates a network to which the aforementioned devices are connected, the aforementioned devices communicate with each other via the network 103.

<Hardware Configuration of Information Processing Device>

Figure 2:
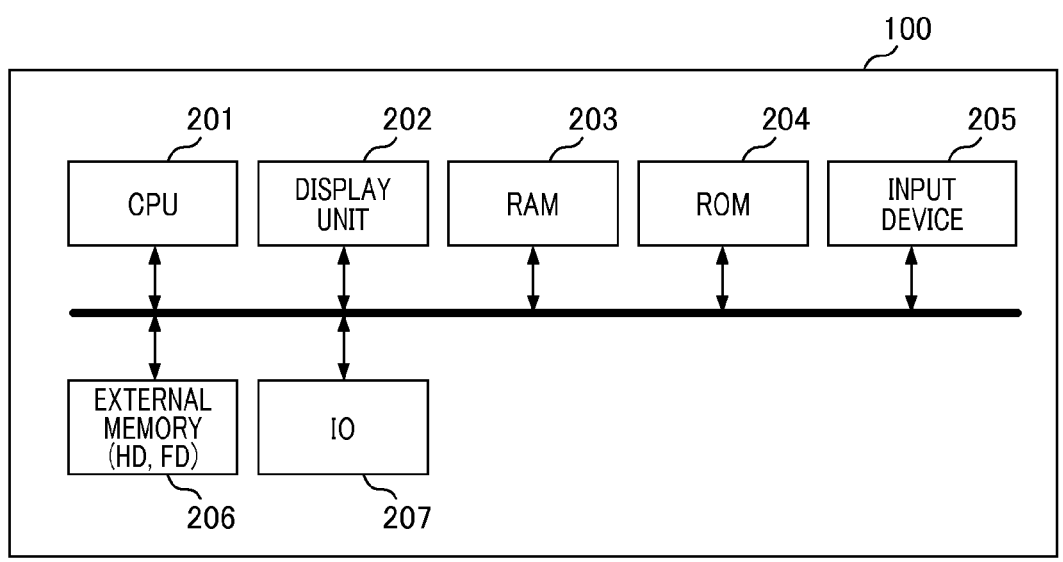
FIG. 2 is a view that shows an example of a hardware configuration of an information processing device.

FIG. 2 shows a hardware configuration of the information processing device 100 shown in FIG. 1. As shown in FIG. 2, the information processing device 100 includes a CPU 201, a display unit 202, a RAM 203, a ROM 204, an input device 205, an external memory 206, and an IO 207. The CPU 201 (Central Processing Unit) is a unit for executing various programs and realizing multiple functions. The RAM 203 (Random Access Memory) stores various programs and execution information, and is used as a temporary work memory area for the CPU 202. The ROM 204 (Read Only Memory) is a unit for storing various programs. The CPU 202 loads programs stored in the ROM 204 into the RAM 203 and executes the programs.

The display unit 202 provides a user with visual feedback relating to output information. The input device 205 accepts an input by a user operation with a keyboard, a pointing device, and the like. An arbitrary memory such as an HDD (Hard Disk Drive) and an FDD (Flexible Disk Drive) is used as the external memory 206. The input/output interface 207 performs communication with an external device. Each unit is capable of transmitting/receiving data to/from each processing unit via the bus. Note that connection configuration with the peripheral device may be wired or wireless. The information processing device 100 connects to the multifunctional devices 101, 102 via the IO 207 and the network 103.

<Software Configuration of Document Management Application>

FIG. 4A and FIG. 4B show examples of function configurations of a document management application 400 and a virtual device application 410 provided in an information processing device 100. The document management application 400 shown in FIG. 4A includes an application control unit 401, a screen display management unit 402, a UI input management unit 403, a virtual device application managing unit 404, an output control unit 405, an output management unit 406, and an output function management unit 407.

The application control unit 401 comprehensively controls cooperation between each processing unit in the application. The screen display management unit 402 controls screen display as a GUI of the document management application 400. The UI input management unit 403 detects operations of the input device 205 by a user via the GUI (Graphical User Interface) of the document management application 400 displayed by the screen display management unit 402, and acquires user operation information. A description will be given below of an example of a GUI of the document management application 400 with reference to FIG. 5.

The output function management unit 407 manages output functions registered with the document management application 400 (FIG. 5, reference numerals 505 to 510), output settings shown in FIG. 3, and drivers corresponding to the output functions. Upon receipt of the selection of an output function and an output instruction by a user via the UI input management unit 403, the output control unit 405 passes a document file to the selected output destination (any one of reference numerals 505 to 510), and transfers the instruction to execute each function by using the document file. When the device object 506 or 507 indicating a print function is selected, the output control unit 405 transfers the output instruction of the document file to a printer driver that is registered with the device object 506 or 507. When the device object 508 indicating a fax function is selected, the output control unit 405 transfers the output instruction of the document file to a fax driver that is registered with the device object 508.

Each driver that has received the instruction converts the document file that has designated as the output instruction to output instruction information that is interpretable by the multifunctional devices 101, 102. The output instruction information refers to information converted to a data format for printing (for example, PDL (Page Description Language) and the like) in case of printing. The output instruction information refers to information converted to a data format for fax (for example, raster data and the like) in case of fax transmission. Then, the driver transmits the converted output instruction information to the multifunctional device 101 or 102 via the network 103.

The output management unit 406 acquires status information for each output function and status information of each execution job via the output function management unit 407. In particular, in case of the device objects 506 and 507 that indicate the print function or the device object 508 that indicates the fax function, the output management unit 406 acquires status information for the multifunctional devices 101, 102 and status information for an execution job. Communication with the multifunctional devices 101, 102 is performed via the output function management unit 407. The details will be given with reference to a virtual device application.

Figure 6:
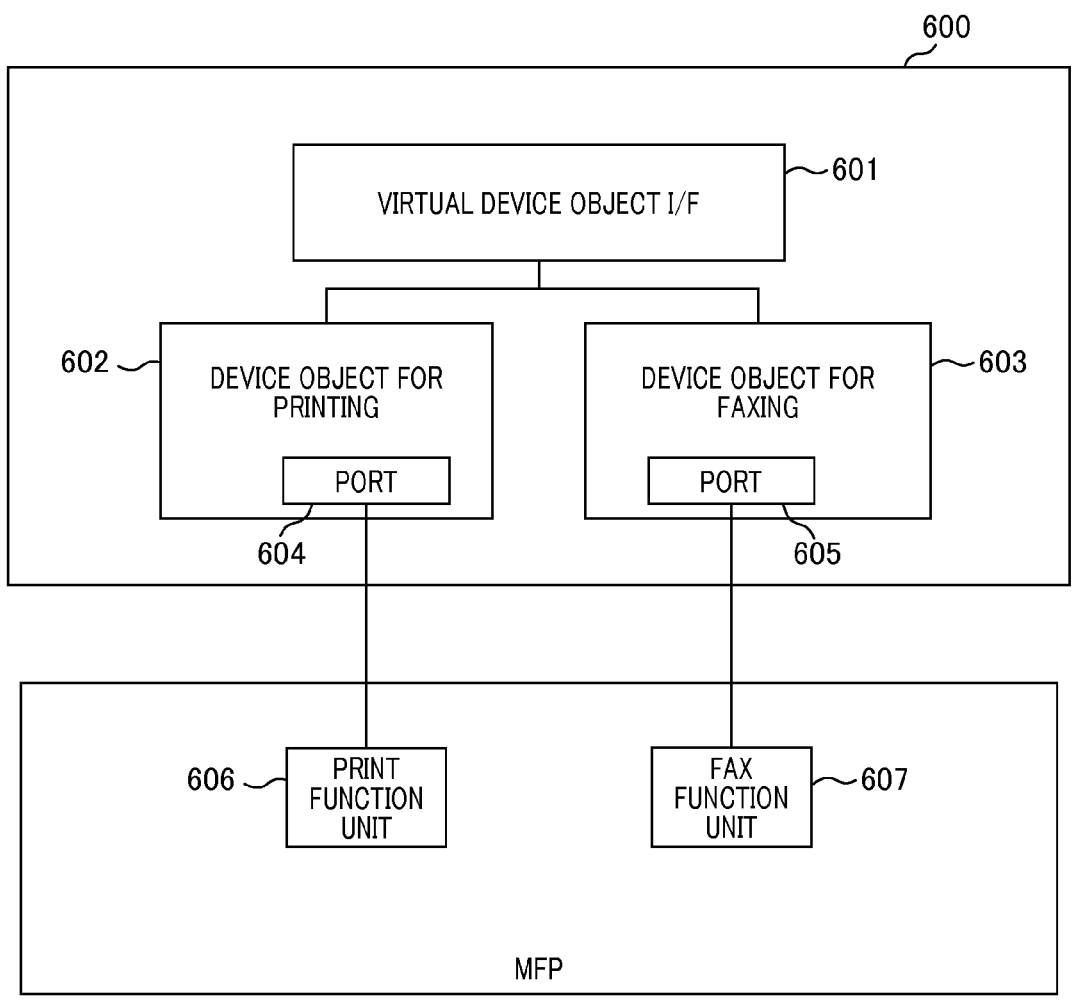
FIG. 6 is a view that shows an example of a logical configuration of a virtual device object.

The virtual device application managing unit 404 accepts selection of an output function and a creation instruction of a virtual device object via the UI input management unit 403, and determines whether or not a virtual device object 600 shown in FIG. 6 can be generated. If a virtual device object 600 can be generated, the virtual device application managing unit 404 transfers the generation instruction and necessary information required for the generation to the virtual device application 410. The virtual device application 410 generates the virtual device object 600 based on the generation instruction and the information transferred from the document management application 400.

<Software Configuration of Virtual Device Application>

Figure 7:
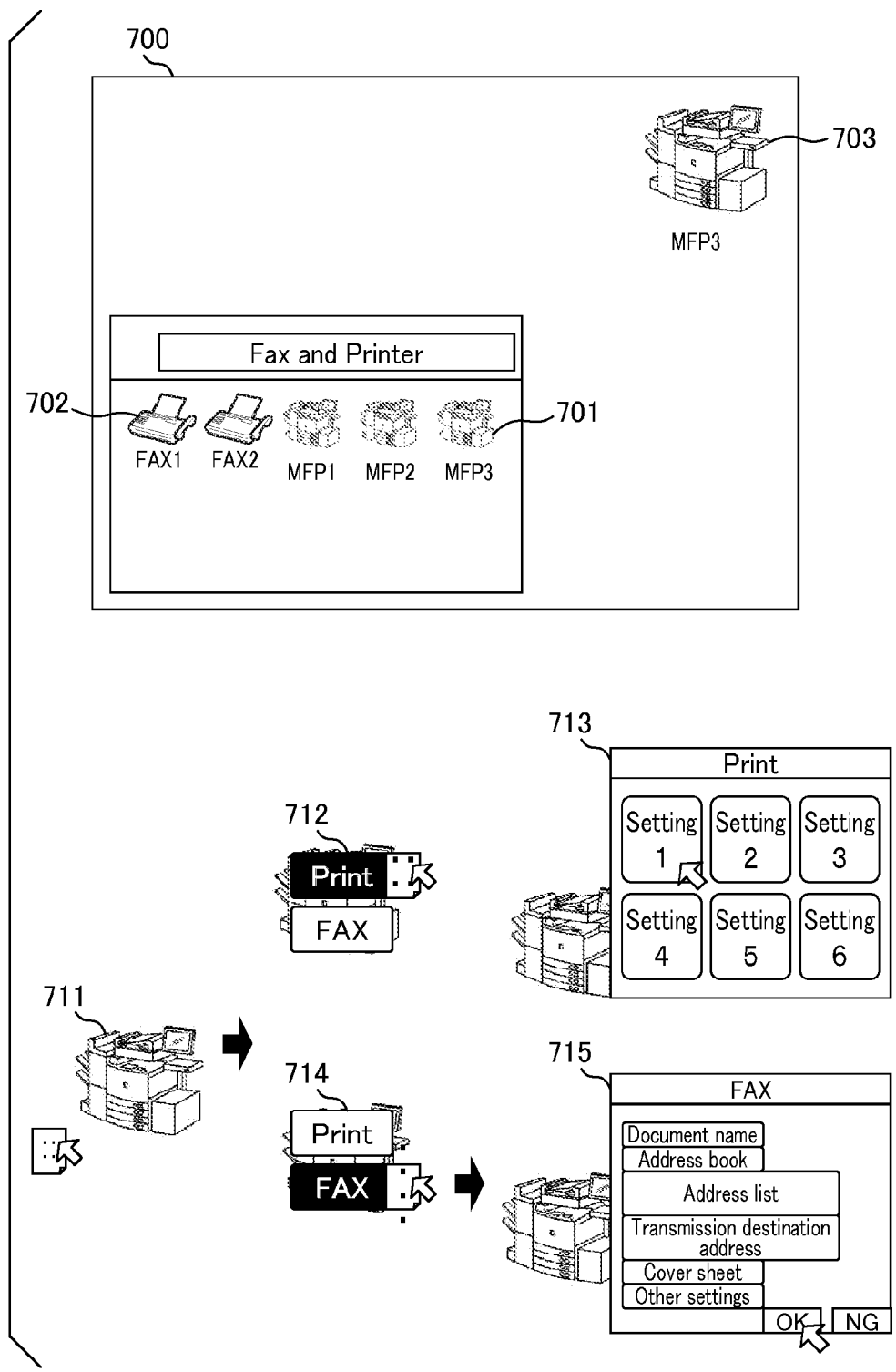
FIG. 7 is a view that shows an example of a UI display of a virtual device object.
Figure 8:
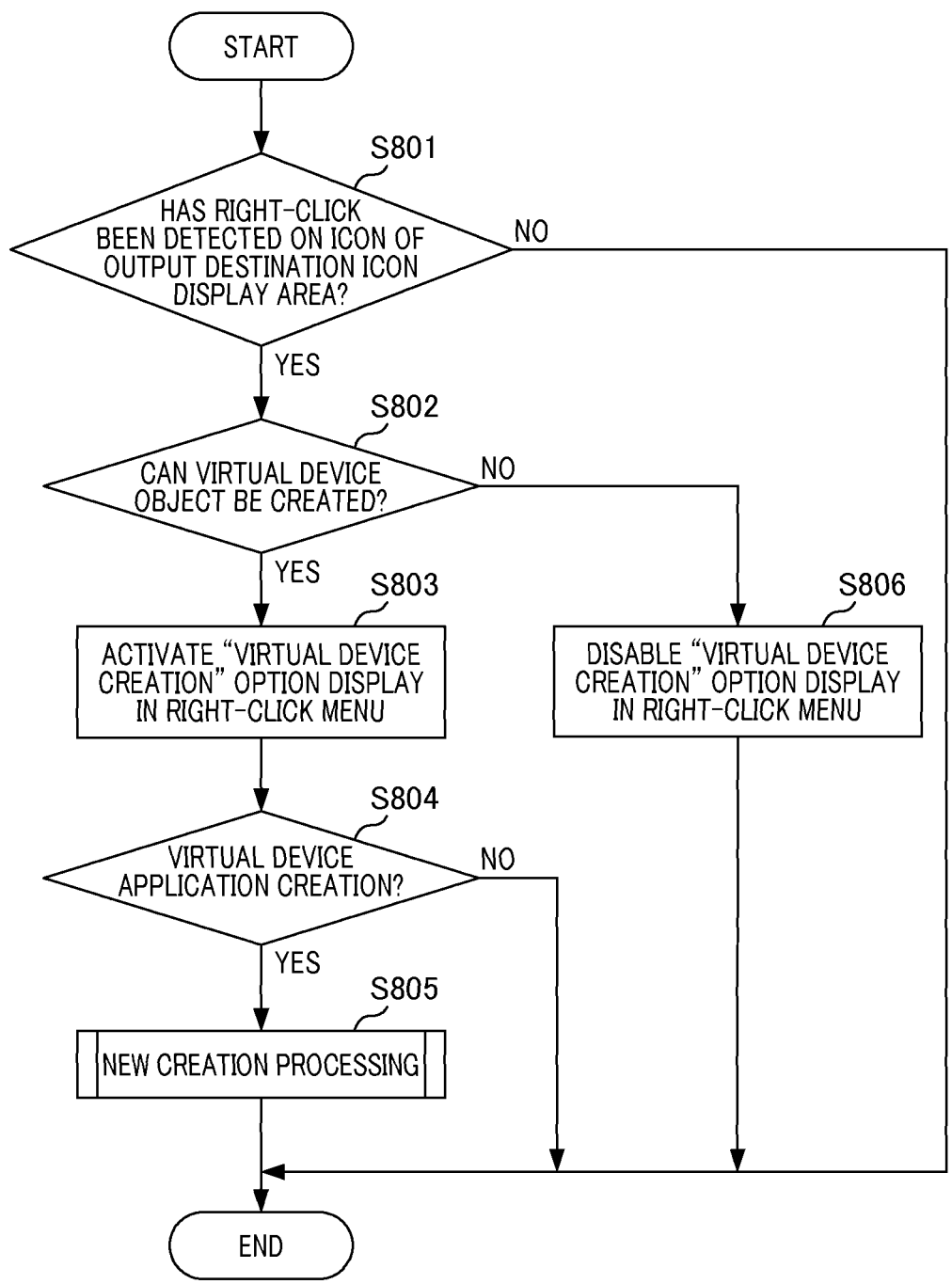
FIG. 8 is a flow diagram indicating virtual device object generating processing.

The virtual device application 410 shown in FIG. 4B generates a virtual device object 703 in which a plurality of device objects (FIG. 5, reference numerals 505 to 510) are integrated on a screen shown in FIG. 7, and causes the virtual device object 703 to serve a virtual device. The screen shown in FIG. 7 is a first screen on which the virtual device object 703 is displayed. The virtual device application 410 displays the generated virtual device object 703 on a desk top screen 700. The virtual device object 703 includes a function that performs output instructions for printing, fax transmission, and the like to the multifunctional device, and a function that displays a usage condition of the multifunctional device and an execution condition of an output job. The virtual device application 410 may generate a virtual device object for each device function such as device objects 701, 702 shown in FIG. 7. In other words, a virtual device object available as a printer and a virtual device object available as a facsimile device may be independently generated. By displaying device functions as an object, user visibility can be enhanced.

The virtual device application 410 includes an application control unit 411, a UI input management unit 412, a screen display management unit 413, a device object information acquiring unit 414, an output control unit 415, an output management unit 416, and a virtual device object managing unit 417. The application control unit 411 comprehensively controls cooperation of functions in the application. The UI input management unit 412 detects operations of the input device 205 by a user via the GUI of the virtual device application 410 displayed by the screen display management unit 413 and acquires user operation information.

As shown in FIG. 7 as an example, the screen display management unit 413 controls screen displays such as a display of the virtual device objects 703 and 711, a display for selecting the output functions 712 and 714, a display of output settings 713 and 715, and the like. Also, an operation of virtual device object is performed by dragging and dropping a file. As shown in FIG. 7, the output function 712 indicates that the printer function has been selected by a user dragging a file. When the user drops the file, the output setting 713 is displayed. Here, the output setting 713 is a screen for selecting a list of templates described below. Note that a template used in this specification denotes a combination of a plurality of print settings. Subsequently, when the user selects the setting displayed on the output setting 713, the file is output by the printer driver registered with the virtual device object according to the setting selected by the user. An output function 714 indicates that a user selects the fax function by dragging a file, and an output setting 715 is displayed when the user drops the file. Then, the user selects one or more items displayed on the output setting 715, and sets each item. Finally, due to pressing of an OK button by the user, the dropped file is output by the fax driver registered with the virtual device object according to the setting. Also, by right-clicking the virtual device object, the printer setting screen 300 and the fax setting screen 301 may be displayed.

The device object information acquiring unit 414 acquires various device object information managed by the OS and various driver information assigned to each device object. In other words, the device object information acquiring unit 414 acquires the print device object 701, fax device object 702, or the like. The printer driver is assigned to the print device object and the fax driver is assigned to the fax device object.

The virtual device object managing unit 417 generates a virtual device object 600 shown in FIG. 6 and places the object 600 under its control. More specifically, the virtual device object managing unit 417 registers various drivers based on information of the device object acquired from the device object information acquiring unit 414, and establishes the virtual device object 600. Also, the virtual device object managing unit 417 writes a configuration of the virtual device object or setting information of the function settings in a setting file of the external memory 206, or reads the setting information from the setting file.

The output control unit 415 instructs the multifunctional devices 101, 102 to output. More specifically, upon receipt of an output instruction from a user via the UI input management unit 412, the output control unit 415 instructs a driver that executes a function corresponding to the output instruction and assigned to the device object. In other words, the output control unit 415 instructs the print-printer driver to output in the case where the output instruction is a print instruction, and instructs the fax driver to output in the case of the output instruction is a fax transmission. Each driver that has received the output instruction converts the document file designated as the output instruction to the print instruction information of which the multifunctional devices 101 and 102 are interpretable as described above with reference to FIG. 4A. Then, each driver transmits the converted output instruction information to the multifunctional devices 101, 102 via the network 103.

The output management unit 416 communicates with the multifunctional devices 101 and 102, and acquires status information of the multifunctional devices 101 and 102 or status information of the execution job. In the case where output ports (FIG. 6, ports 604, 605) set in the device object are ports for monitoring and correspond to an application of the virtual device application 410, the following processing is performed. Specifically, the output management unit 416 acquires status information (printable, error or the like) of the multifunctional devices 101 and 102 or status information (during processing, completion or the like) of the execution job (print, or fax transmission) via the output ports. The output management unit 416 passes the acquired status information to the screen display management unit 413, and the screen display management unit 413 displays the status information on the GUI of the virtual device object (not shown).

<Document Management Application UI Example>

Figure 5:
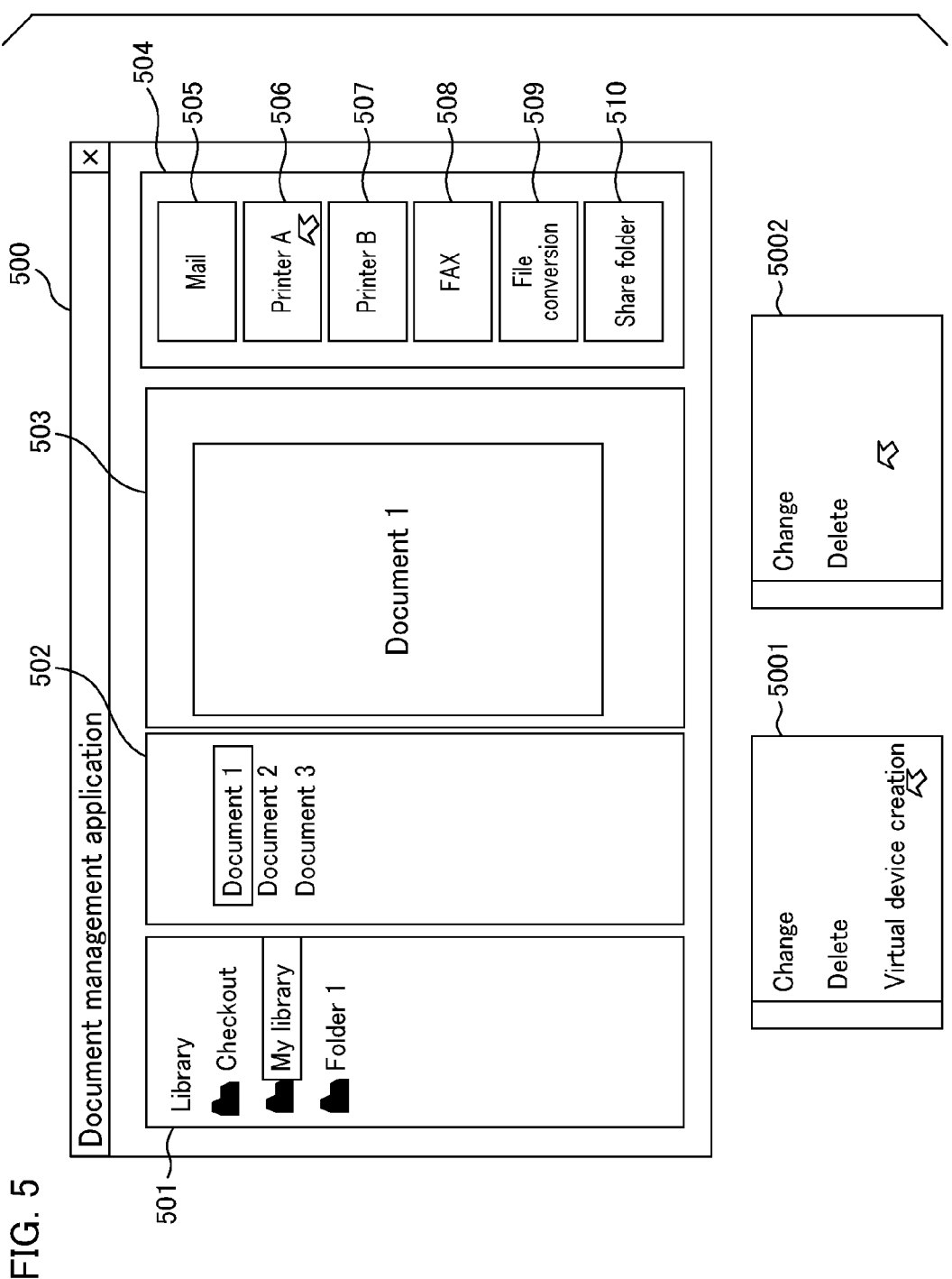
FIG. 5 is a view that shows an example of a UI display of a document management application.

FIG. 5 shows a UI example of the document management application 400 that is provided in the information processing device 100 and functions as a second screen. The document management application 400 has a navigation pane 501, a file list pane 502, a preview pane 503, and an output destination icon display area 504 in a main window 500. The navigation pane 501 is an area for displaying libraries or folders that store documents in a tree structure. The file list pane 502 is an area for displaying a document file and the like in the folder selected from the navigation pane 501 by a user. The preview pane 503 is an area for displaying a preview of the document selected by a user from the file list pane 502.

The output destination icon display area 504 is an area for displaying, for each output function, icons such as applications registered as an output destination of the document file, devices, share folders, and the like. The document management application 400 has a function for registering a variety of output destinations. A registration example of the output destination includes the device objects 506 and 507 for causing the multifunctional device to execute printing, the device object 508 for causing the multifunctional device to fax, and the like. The output destination icon display area 504 also functions as an operation area, and the screen display management unit 402 displays the menu 5001 or the menu 5002 when a user right-clicks a mouse on the icon of the output destination icon display area 504.

As shown in FIG. 5, when the function is an output function with which the virtual device application can be created, the screen display management unit 402 displays an operation item with which the user can instruct "virtual device creation" in the menu 5001 that is displayed by right-clicking by a user. On the other hand, when the virtual device application cannot be created, the screen display management unit 402 does not display the operation item with which the user can instruct "virtual device creation" in the menu 5001 that is displayed by right-clicking by a user. Also, when a user selects "change" item in the menu, the screen display management unit 402 displays items that a user can set depending on the output functions as shown in FIG. 3.

FIG. 3 shows a printer setting screen 300 and a fax setting screen 301. The printer setting screen 300 is displayed when "change" is selected on the menu 5001 or the menu 5002 that is displayed due to the right-click of the device object 506 or 507. The fax setting screen 301 is displayed when "change" is selected on the menu 5001 or the menu 5002 that is displayed due to the right-click of the device object 508. Various settings for the print function include the following specific example shown in the printer setting screen 300: an ON/OFF setting for a printer selection or a device status display, an ON/OFF setting for setting whether or not to apply a pre-designated template setting without any conditions when printing, an icon button name, an ON/OFF setting for annotation printing, an ON/OFF setting for setting whether or not to use a paper approximate to a document size when printing, and the like.

Various settings for the fax function include the following specific example shown in the printer setting screen 301: an ON/OFF setting for setting whether or not to batch transmit selected documents, an on/off setting for setting whether or not to confirm a preview when faxing, an icon button name, an on/off setting for cover sheet attachment, selection for a cover sheet template, an on/off setting for storing a fax transmission image, an on/off setting for whether or not to automatically acquire a fax number from a document when faxing, an on/off setting for setting whether or not to acquire and designate a fax number of a transmission destination from an address book of a fax driver, an on/off setting for setting whether or not to acquire and designate a fax number of a transmission destination from an address book of a device, an ON/OFF setting for faxing a document with annotation, an ON/OFF setting for setting whether or not to use a paper approximate to a document size when faxing, an ON/OFF setting for setting whether or not to designate an external originating number when faxing, a designation of transmission time, and the like.

<Logical Configuration of Virtual Device Object>

FIG. 6 shows an example of a logical configuration of the virtual device object 600 generated by the virtual device application 410. The virtual device application 410 generates the virtual device object 600 by using the device object. The virtual device object 600 has a virtual device object I/F 601 as an I/F to each device object. The virtual device object 600 also has the device objects 602 and 603 representing logical devices corresponding to the multifunctional device.

In the present embodiment, the virtual device object 600 is configured such that the device object 602 and the fax device object 603 are assigned. Also, the output ports 604 and 605 are set in device objects 602 and 603, respectively. The output management unit 416 outputs jobs to the device function units 606 and 607 of the multifunctional devices 101 and 102 that realize each function via these output ports. More specifically, upon receipt of a print instruction from a user, the virtual device object 600 outputs print instruction information to the print function unit 606 via the device object 602 assigned for printing. In the case of fax transmission, the virtual device object 600 outputs output instruction information to the fax function unit 607 via the device object 603 assigned for faxing.

In the case where the output ports 604 and 605 set in each device object are ports for monitoring, the output management unit 416 performs the following processing. Specifically, the output management unit 416 acquires status information (printable, error or the like) of the device function units 606 and 607 of the multifunctional device, or status information (under processing, completion or the like) of execution job (print, or fax transmission) via the output ports. When the output management unit 416 passes the acquired status information to the screen display management unit 413, the screen display management unit 413 displays the status information on the GUI of the virtual device object.

In the case where there is a plurality of multifunctional devices such as the system configuration of the present embodiment (FIG. 1), a combination of functions of each multifunctional device is available. For example, a printer device of the MFP 1 (101) can be combined with a fax device of the MFP 2 (102) for use. In such a case, the printer object of the MFP 1 and for printing and the printer object of the MFP 2 and for faxing are assigned to the virtual device object.

<An Example of Processing for Generating Virtual Device Object>

A description will be given of a processing for generating a virtual device object by the information processing device of the present embodiment with reference to flowcharts of FIG. 8 to FIG. 11. The CPU 201 loads the document management application 400, the virtual device application 410, the printer driver, or the like, which are stored in the ROM 204 or the external memory 206, into the ROM and executes them to thereby realize each processing flow.

The application control unit 401 of the document management application 400 detects whether or not a right-click has been made on the icon in the output destination icon display area (FIG. 5, reference numeral 504) via the UI input management unit 403. In S801, when the UI input management unit 403 detects the right-click by a user, the virtual device application managing unit 404 determines availability of creation of a virtual device object relative to the output target of which the right-click has been detected (S802). A description will be given below with reference to a flowchart in FIG. 9 with respect to the details of the processing for determining the ability to create a virtual device object.

In S802, when it is determined that creation of the virtual device object is possible, the application control unit 401 activates an option for "virtual device creation" display of the right-click menu (S803), the screen display management unit 402 displays the menu 5001 shown in FIG. 5. Next, the UI input management unit 403 determines whether or not "virtual device creation" has been selected on the right-click menu (S804). When "virtual device creation" has been selected on the right-click menu in S804, the application control unit 401 executes the processing for newly creating a virtual device object via the virtual device application managing unit 404 (S805). A detailed description will be given below of the processing for newly creating a virtual device object with reference to a flowchart of FIG. 10.

Also, when it is determined that creation of a virtual device object is impossible in S802, the application control unit 401 of the document management application disables the option of "virtual device creation" display on the right-click menu (S806). Then, the screen display management unit 402 displays the menu 5002 shown in FIG. 5. Also, when the right-click has not been detected on the icon in the output destination icon display area in S801, the application control unit 401 of the document management application terminates the processing. In the same manner, when "virtual device creation" is not selected on the right-click menu in S804, the application control unit 401 of the document management application also terminates the processing.

<Processing for Determining Availability of Creation of Virtual Device Object>

Figure 9:
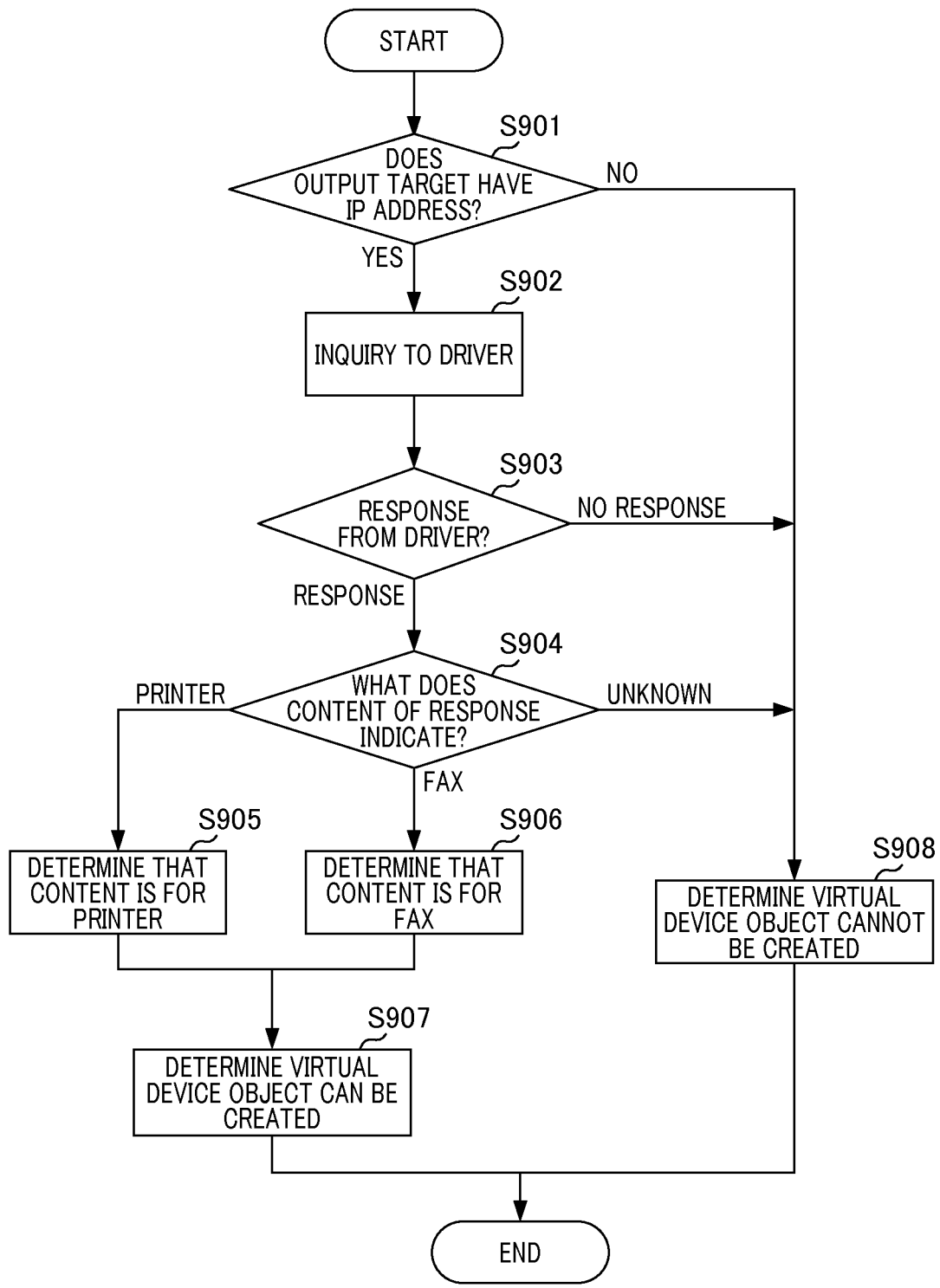
FIG. 9 is a flow diagram indicating processing for determining the availability of creation of virtual device object.

The details will be given of a processing for determining availability of creation of the virtual device object (S802) with reference to a flowchart in FIG. 9. Firstly, the output function management unit 407 checks whether or not the output target has a network address such as an IP address for confirming whether or not the selected output target is a device that is connected to the network (S901). In the specification, the description is given by using the IP address as a network address. Alternatively, a name (a host name or a computer name) may be employed. When it is determined that the output target has the IP address in S901, the output function management unit 407 assumes it to be a fax driver or a printer driver, and inquires a driver of the selected output target (S902).

Next, the output function management unit 407 determines whether any response by any driver is present or absent (S903). If the response from the driver is present, the output function management unit 407 further determines contents of the response (S904). When a device type is included in the contents of the response, and the device type indicates a printer, the output function management unit 407 determines that the selected output target is the printer (S905). When the device type is included in the contents of the response, and the device type indicates a fax, the output function management unit 407 determines that the selected output target is the fax (S906). Then, when the output function management unit 407 has successfully determined the driver type in S905 or S906 described above, the virtual device application managing unit 404 determines that creation of the virtual device object is possible (S907).

Also, when the device type is not included in the contents of the response or the device type is an unknown device type acquired in S904, the virtual device application managing unit 404 determines that creation of the virtual device object is impossible (S908). Also, when it is determined that the output target does not have an IP address in S901, or that there is no response from the driver in S903, the virtual device application managing unit 404 also determines that creation of the virtual device object is impossible (S908).

<Processing for Newly Creating Virtual Device Object>

Figure 10:
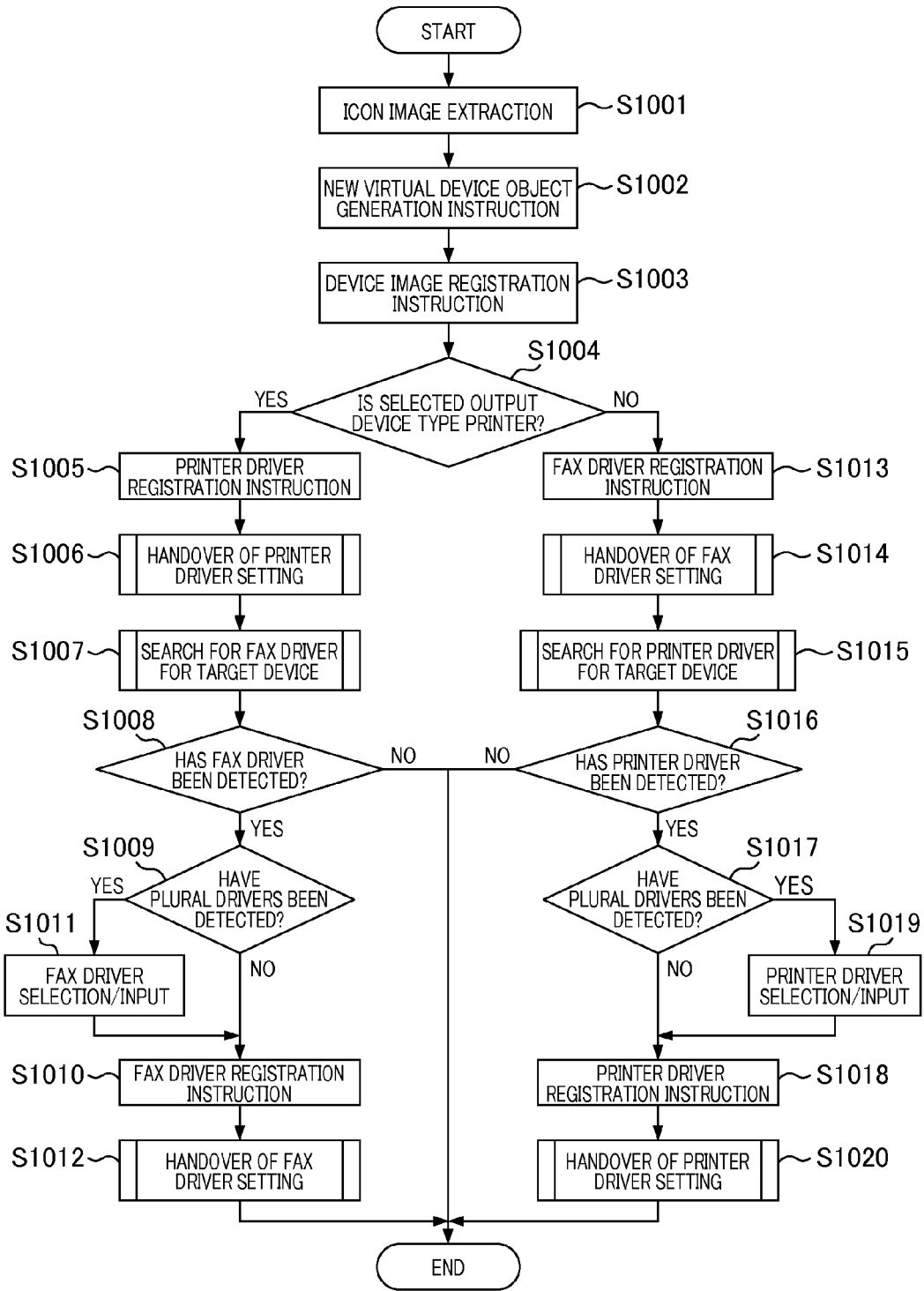
FIG. 10 is a flow diagram indicating processing for newly generating a virtual device object.

The details will be given of a processing for newly creating virtual device object (S805) with reference to a flowchart in FIG. 10. Firstly, for using the icon selected in the output destination icon display area as an image of the virtual device object, the virtual device application managing unit 404 extracts an icon image from the output destination icon display area 504 shown in FIG. 5 (S1001). Next, the virtual device application managing unit 404 instructs the virtual device application 410 to generates a new virtual device object with which neither a printer driver nor a printer driver is registered (S1002). In response to the aforementioned instruction, the virtual device application 410 generates a new virtual device object with which neither a printer driver nor a fax driver is registered.

Next, the virtual device application managing unit 404 instructs the virtual device application 410 to register the icon image extracted in S1001 as a device image with the virtual device object created in S1002 (S1003). In response to this instruction, the virtual device application 410 registers the icon image as the device image with the virtual device object created in S1002. Next, the virtual device application managing unit 404 determines whether or not the driver type, which has been determined in the processing for determining the ability to create the virtual device application in S802, indicates a printer or a fax (S1004).

When the device type indicates the printer in S1004, the virtual device application managing unit 404 issues the following instruction to the virtual device application 410 (S1005). Specifically, the virtual device application managing unit 404 instructs registering the print driver associated with the icon selected in the output destination icon display area with the virtual device object created in S1002.

The printer driver is held by the document management application by association with the icon of the output destination icon display area. In response to the aforementioned instruction, the virtual device application 410 registers the printer driver with the virtual device object created in S1002. More specifically, the document management application passes a driver name to the virtual device application 410, and the virtual device application 410 specifies and registers the printer driver based on the acquired printer name. Alternatively, a configuration may be applied in which a device object name is used for registration instead of the driver name.

Next, the virtual device application managing unit 404 instructs the virtual device application 410 to hand over the printer driver settings from the document management application to the virtual device object (S1006). In response to this instruction, the virtual device application 410 hands over the printer driver settings to the virtual device object generated in S1003. The details will be given below of the processing for handing over the printer driver settings with reference to a flowchart in FIG. 12.

Next, the virtual device application managing unit 404 searches for a fax driver of which a corresponding device is same with the printer driver registered with the virtual device application generated in S1002 as a target (S1007). The details will be given below of the processing for searching for different function drivers of which the corresponding device is same with the printer driver registered with the virtual device application as the target (S1007) with reference to a flowchart in FIG. 11. Next, in the search processing of S1007, the virtual device application managing unit 404 determines whether or not a fax driver that targets a device that is the same as the printer driver registered with the virtual device application is the target, has been detected (S1008). When the relevant fax driver has been detected in S1008, the virtual device application managing unit 404 determines whether there is one or more detected fax driver (S1009). When the relevant fax driver is one in S1009, the virtual device application managing unit 404 issues the following instruction to the virtual device application 410 (S1010). Specifically, the virtual device application managing unit 404 instructs registering the detected fax driver with the virtual device object created in S1002.

When it is determined that there are plural detected fax driver in S1009, the virtual device application managing unit 404 accepts the selection of a fax driver by a user via the UI input management unit 403 (S1011). Next, the virtual device application managing unit 404 instructs the virtual device application 410 to register the fax driver selected in S1011 with the virtual device object created in S1002 (S1010). In response to this instruction, the virtual device application 410 registers the fax driver with the virtual device object created in S1002. Next, the virtual device application managing unit 404 instructs the virtual device application 410 to hand over fax driver settings from the document management application to the virtual device object (S1012). The details will be given below of the processing for handing over the fax driver settings (S1012) with reference to a flowchart in FIG. 12.

Also, when the device type of the output target indicates a fax in S1004, the virtual device application managing unit 404 issues the following instruction. Specifically, the virtual device application managing unit 404 instructs the virtual device application 410 to register the fax driver associated with the icon selected in the output destination icon display area with the virtual device object (S1013). Here, the fax driver is held by the document management application by association with the icon of the output destination icon display area. In response to the aforementioned instruction, the virtual device application 410 registers the fax driver with the virtual device object created in S1002.

Next, the virtual device application managing unit 404 instructs the virtual device application 410 to hand over the fax driver settings from the document management application to the virtual device object (S1014). In response to this instruction, the virtual device application 410 hands over the fax driver settings to the virtual device object generated in S1002. The details will be given below of the processing for handing over the fax driver settings with reference to a flowchart in FIG. 12.

Next, the virtual device application managing unit 404 searches for printer drivers targeting the same device as the printer driver registered with the virtual device application generated in S1002 (S1015). The details will be given below with respect to the processing for searching for different function drivers targeting the same device as the driver registered with the virtual device application (S1015) with reference to a flowchart in FIG. 11.

Next, the virtual device application managing unit 404 in S1015 determines whether or not a printer driver targeting the same device as the fax driver registered in the virtual device application generated in S1002 has been detected in the processing in S1015 (S1016). When the relevant printer driver has been detected in S1016, the virtual device application managing unit 404 determines whether there are one or more detected driver (S1017).

When there is one relevant printer driver in S1017, the virtual device application managing unit 404 issues the following instruction. Specifically, the virtual device application managing unit 404 instructs the virtual device application 410 to register the relevant printer driver with the virtual device object created in S1002 (S1018). In response to this instruction, the virtual device application 410 registers the printer driver with the virtual device object created in S1002. When it is determined that there are plural detected drivers in S1017, the virtual device application 410 accepts selection of a printer driver by a user via the UI input management unit 403 (S1019).

Next, the virtual device application managing unit 404 instructs the virtual device application 410 to register the print driver selected in S1019 with the virtual device object created in S1002 (S1018). In response to the aforementioned instruction, the virtual device application 410 registers the printer driver with the virtual device object created in S1002.

Next, the virtual device application managing unit 404 instructs the virtual device application 410 to hand over printer driver settings from the document management application to the virtual device object (S1020). In response to this instruction, the virtual device application 410 hands over the printer driver settings to the virtual device object created in S1002. The details will be given below with respect to the handover processing of the printer driver settings (S1020) with reference to FIG. 12. Also, when the relevant driver has not been detected in S1008 or S1016, the virtual device application managing unit 404 terminates the new generation processing. After the processing described with FIG. 10, the virtual device object is displayed on the first screen based on the icon image extracted in S1001. Although selection by the user via the UI input management unit 403 is prompted in the present embodiment, all of the plurality of drivers may be automatically registered when a plurality of drivers have been detected in S1009 and S1017.

<Search Processing of Different Function Drivers>

Figure 11:
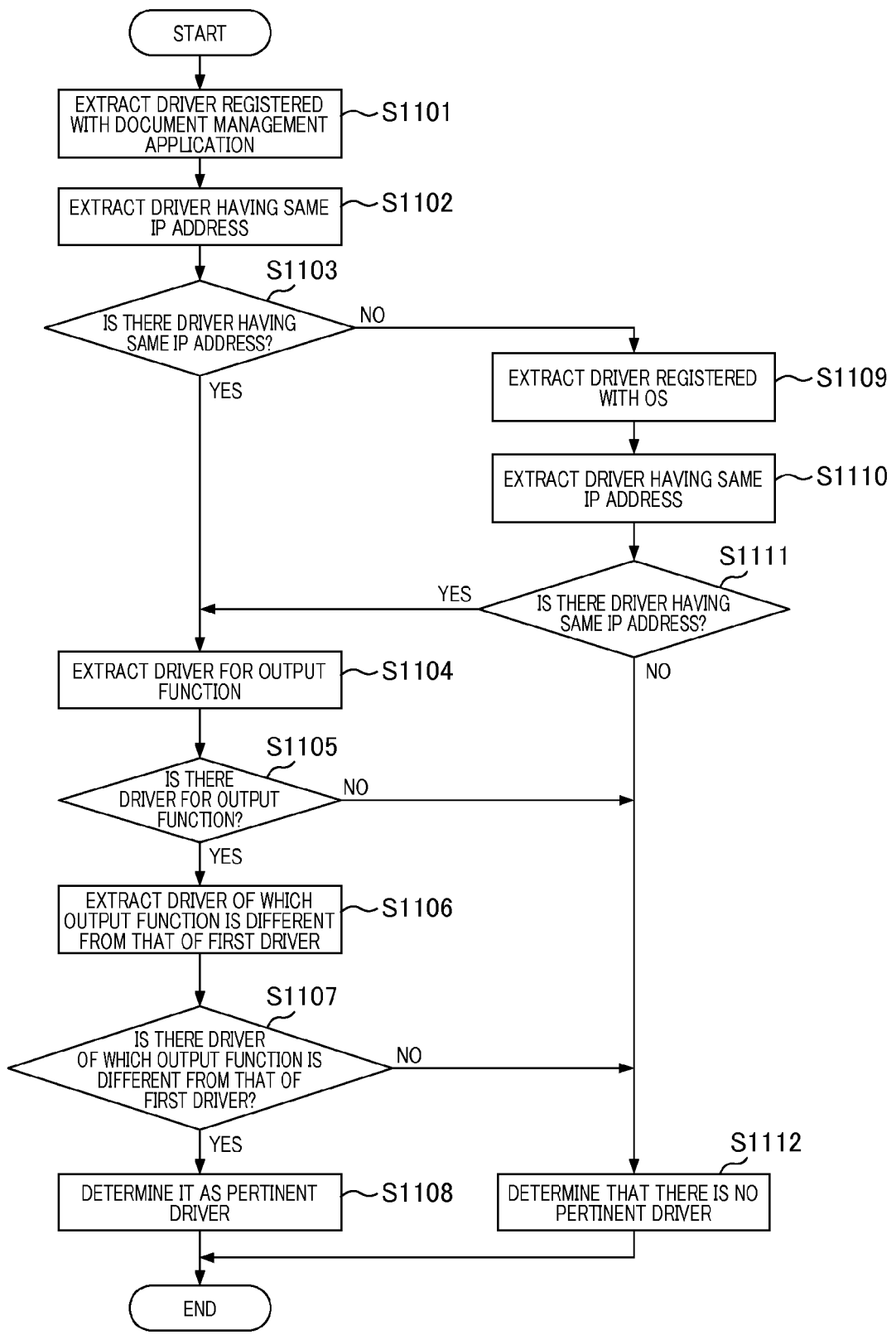
FIG. 11 is a flow diagram indicating processing for searching for different function drivers.

The details of the processing (S1007) for searching different function drivers targeting a device that is the same as the driver registered in the virtual device application is indicated in a flowchart in FIG. 11. Note that the description omits the detail of the processing in S1015 since, except for difference of function of the firstly registered driver, the processing is the same as that in S1007.

Firstly, the output function management unit 407 extracts all drivers registered with the document management application (S1101). Next, the output function management unit 407 extracts one or more drivers that have the same IP address as the driver registered in S1005 or S1013 (also referred to a first driver) from among drivers extracted in S1101 (S1102). Next, the output function management unit 407 determines presence or absence of the driver (a second driver) that has the same IP address as the first driver (S1103). When the one or more drivers have been extracted in S1103, the output function management unit 407 further extracts one or more drivers for output function from the extracted drivers in S1102 (S1104). The driver for the output function denotes a driver that exchanges data with the image processing device. In the present embodiment, an environment is considered where a driver that does not exchange data with the image processing device (for example, a PDF writer) is extracted from the drivers in S1102. Hence, in the case of an environment where the driver for the output function is not included in the drivers extracted in S1102, the processing in S1104 is not required.

Next, the output function management unit 407 determines presence or absence of the driver for the output function (S1105). When the driver for the output function has been extracted in S1105, the output function management unit 407 further extracts one or more drivers of which output function is different from that of the first driver (S1106). Next, the output function management unit 407 determines presence or absence of a driver that is different from the first driver (S1107). When a driver that is different from the first driver has been extracted in S1107, the virtual device application managing unit 404 determines that the extracted second driver is the driver currently being searched for in the processing of S1007 or S1015 (S1108).

When no driver has been extracted as a result of extraction of the driver registered with the document management application 400 in S1103, the output function management unit 407 extracts all drivers registered in the OS (S1109). Next, the output function management unit 407 further extracts one or more drivers that have the same IP address with the first driver registered with the virtual device object from among the drivers extracted in S1109 (S1110). Next, the output function management unit 407 determines presence or absence of a second driver that has the same IP address with the first driver (S1111). When the second driver has been extracted in S1111, the output function management unit 407 further extracts one or more drivers for the output function from among the drivers extracted in S1109 (S1104). When no driver has been extracted in S1111, the virtual device application managing unit 404 determines that there is no driver corresponding to the second driver currently being searched for (S1112).

Similarly, the virtual device application managing unit 404 also determines that there is no driver corresponding to the second driver currently being searching for when the function of the second driver is not for the output function in S1105 (S1112). Similarly, the virtual device application managing unit 404 also determines that there is no driver corresponding to the second driver currently being searching for when there is no driver of which the function of the second driver differs from that of the first driver in S1107 (S1112).

A configuration may be applied where only drivers originally registered in the OS are made candidates for extraction by replacing the processing in S1101 with that in S1109. Based on the following two reasons, the drivers registered with the document management application are extracted, and the extracted drivers are considered to be a candidate of the target as shown in S1101 of FIG. 11. First, the number of the drivers registered with the document management application is less than drivers registered with the OS. Thus, by considering not drivers registered with the OS but drivers registered with the document management application as a candidate, high speed processing is enabled. Secondly, there is high probability where both printer driver and fax driver are simultaneously registered with the document management application.

<Setting Handover Processing>

Figure 12:
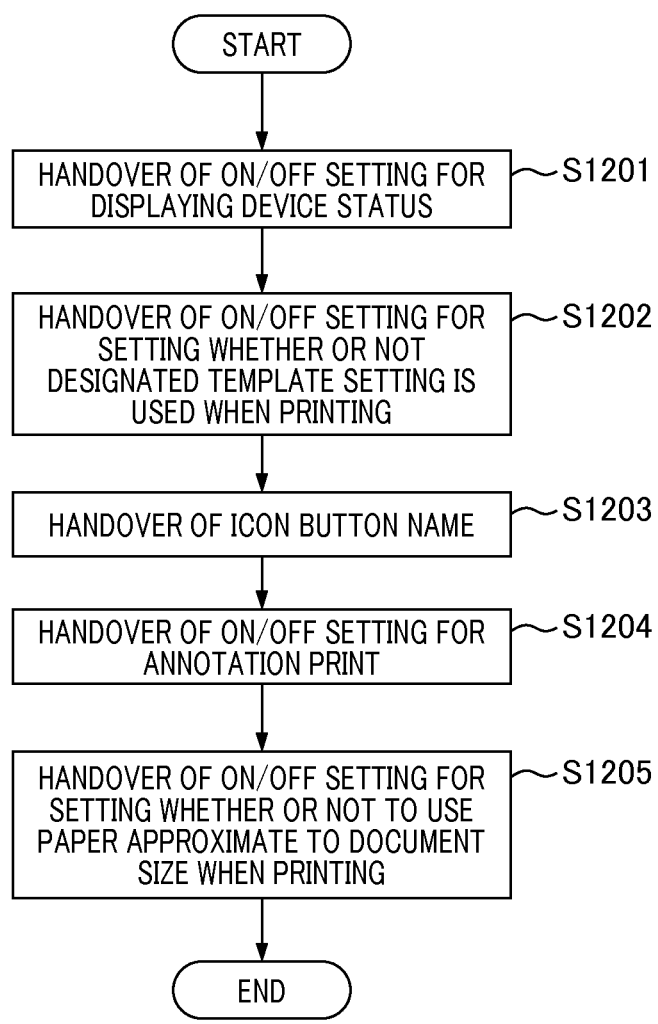
FIG. 12 is a flow diagram indicating processing for handing over printer driver settings.

The details are given of the handover processing of the printer driver settings (FIG. 10, S1006, S1020) and the details are given of the handover processing of the fax driver settings (S1012, S1014) with reference to a flowchart in FIG. 12. Firstly, in the case of the handover processing of the printer driver settings (S1006, S1020), the virtual device application managing unit 404 issues the following instruction. Specifically, the virtual device application managing unit 404 instructs the virtual device application 410 to hand over the printout settings from the document management application to the virtual device object.

Firstly, the virtual device application managing unit 404 extracts various settings for printout held by the document management application 400 by associating them with the icon of the output destination icon display area. Such various settings are managed by the output function control unit 407 of the document management application 400. Then, the virtual device application managing unit 404 communicates with the virtual device application 410 to hold the settings in the virtual device object created in S1002.

In response to the aforementioned information communication, the virtual device application 410 holds the settings in the virtual device object created in S1002. The various settings for printout, for example, the settings 300 shown in FIG. 3, are handed over to the virtual device object. In S1201, the ON/OFF setting for displaying the device status is handed over. In S1202, the ON/OFF setting for a template setting for setting whether or not the pre-designated template setting is applied without any conditions when printing. In S1203, the icon button name is handed over. In S1204 the ON/OFF setting for the annotation printing is handed over. In S1205, the ON/OFF setting for setting whether or not to use a paper approximate to a document size when printing is handed over. Note that the order of the various settings is not limited to the above order, and any settings may be handed over in any order. With the above processing, the virtual device object 600 can execute the print processing with the handed over various settings and the printer driver. Also, a user can reconfigure the handed over various setting item on the virtual device object 600 by using the UI input management unit 412.

Next, in the case of the handover processing of the fax driver settings (S1012, S1014), the virtual device application managing unit 404 issues the following processing shown in FIG. 13. Specifically, the virtual device application managing unit 404 instructs the virtual device application 410 to hand over settings for a fax transmission method from the document management application (S1211 to S1223). In other words, the virtual device application managing unit 404 extracts the fax transmission method held by the document management application by associating it with the icon of the output destination icon display. Then, the virtual device application managing unit 404 communicates with the virtual device application 410 to hold the settings in the virtual device object created in S1002.

In response to the aforementioned information communication, the virtual device application 410 holds the fax transmission method in the virtual device object 600 created in S1002. The fax transmission method, for example, the settings 301 shown in FIG. 3, are handed over to the virtual printer object. In S1211, the ON/OFF setting for setting whether or not to batch transmit selected documents is handed over. In S1212, the ON/OFF setting for setting whether or not to confirm the preview when faxing is handed over. In S1213, the icon button name is handed over. In S1214, the ON/OFF setting for cover sheet attachment is handed over. In S1215, the selection for the cover sheet template is handed over. S1216, the ON/OFF setting for storing the fax transmission image is handed over. In S1217, the ON/OFF setting for setting whether or not to automatically acquire the fax number when faxing from a document is handed over. In S1218, the ON/OFF setting for setting whether or not to acquire and designate the transmission destination fax number from the address book of the fax driver is handed over. In S1219, the on/off setting for setting whether or not to acquire and designate the transmission destination fax number from an address book of a device is handed over. In S1220, the ON/OFF setting for faxing a document with annotation is handed over. In S1221, the ON/OFF setting for setting whether or not to use a paper approximate to a document size when faxing is handed over. In S1222, the ON/OFF setting for setting whether or not to designate external originating number when faxing is handed over. In S1223, the designation of transmission time is handed over.

With the above processing, the virtual device object 600 can execute transmission processing with the fax driver by using the handed over various settings. Also, the user can reconfigure the various setting items handed over by using the UI input management unit 412 on the virtual device object 600 side.

With the above processing, according to the present invention, when an application receives an instruction from a user to create a virtual device object by using a driver, the registration of the driver with the virtual device object becomes possible. Specifically, according to the information processing device of the present invention, when creating the virtual device object, an appropriate driver corresponding to the device can be registered, and the virtual device object in which a plurality of functions of the device can be simply created. When a user selects an output device registered with the document management application, the information processing device according to the present invention generates the virtual device object, and registers the driver corresponding to the device. Therefore, the driver registration processing is improved by being simplified so that the burden of a user is reduced.

Also, the information processing device according to the present invention automatically searches and registers the different function drivers that target the same device as the drivers registered with the virtual device object, the work burden posed on a user can be further reduced when generating the virtual device object. In addition, the settings relating to the output function of the document management application that is the first application can be automatically handed over to the virtual device object generated by the virtual device application that is the second application. Therefore, the burden of a user in the virtual device object creation is further reduced.

(Second Embodiment)

In the first embodiment, a user selects the output function registered with the document management application in which the driver corresponding to the image processing device is selectable. In this example, the information processing device enables automatic processing of the driver registration work relative to the virtual device object generated by the virtual device application that is the second application. In the second embodiment, the output function registered with virtual device object generated by the virtual device application is automatically registered with the document management application.

Hereinafter, differences between the processing by the information processing device 100 and that in the first embodiment will be explained with reference to flowcharts in FIG. 14. The CPU 201 loads the document management application 400, the virtual device application 410, printer driver, or the like that are stored in the ROM 204 or the external memory 206 into the ROM and executes them to thereby realize each processing flow. Unless otherwise stated, the document management application 400 and the virtual device application 410 in the second example have the same configuration as that in the first embodiment.

The application control unit 401 of the document management application detects whether or not a drag and drop operation relative to the virtual device object on the output destination icon display area (FIG. 5, reference numeral 504) has been carried out via the UI input management unit 403 (S1301). When it is determined that the virtual device object has been dropped in S1301, the virtual device application managing unit 404 instructs the virtual device application 410 to extract one or more drivers registered with the virtual device object (S1302). In response to this instruction, the virtual device application 410 extracts the one or more drivers from the dropped virtual device object.

Next, application control unit 401 of the document management application determines presence or absence of the driver extracted by the virtual device application 410 (S1303). When there is the driver as a result of the processing in S1303, the application control unit 401 of the document management application determines whether or not the extracted driver has already been registered with the document management application (S1304). When it is determined in S1304 that the extracted driver is unregistered, the virtual device application managing unit 404 hands over the device image of the virtual device object 600 from the virtual device application 410 (S1305).

Next, the virtual device application managing unit 404 hands over the settings of the virtual device object 600 from the virtual device application 410 (S1306). The details are omitted with respect to the setting handover processing of the virtual device object 600 (S1306) since this is the same processing as the flowchart described with reference to FIG. 12 and FIG. 13. Next, the output function management unit 407 registers the target driver based on the device image and setting information handed over from the virtual device object 600 as well as displaying an icon on the output destination icon display area via the screen display management unit 402. Next, the processing advances to S1302, and the virtual device application managing unit 404 repeats the processing.

When no driver has been extracted in S1303, the application control unit 401 of the document management application terminates the registration processing with document management application. Also, when the UI input management unit 403 has detected no virtual device object on the output destination icon display area in S1301, the application control unit 401 executes no processing. Also, when the extracted driver has already been registered in S1304, the virtual device application managing unit 404 accepts selection by a user as to whether the processing is to be continued via the UI input management unit 403 (S1308). When the accepted selection indicates a continuation of the processing in S1308, the processing advances to S1302, and the virtual device application managing unit 404 repeats the processing. When the accepted selection indicates that the processing is not to be continued in S1308, the virtual device application managing unit 404 terminates the registration processing.

With the above processing, the output functions registered on the virtual device object side and generated by the virtual device application that is the second application can be automatically registered with the document management application that is the first application. Therefore, the output function registered with only the virtual device object can be simply registered with the document management application, and the work burden posed on a user can be reduced.

(Third Embodiment)

In the first embodiment, the output function registered in the document management application that is the first application is selected. In this example, the information processing device enables automatic processing of the driver registration work relative to the virtual device object generated by the virtual device application that is the second application. In the third embodiment, an example is described where an output function registered with the document management application that is the first application is deregistered when a printer driver is registered with the virtual device object that is generated by the virtual device application that is the second application.

Hereinafter, the differences between the processing by the information processing device 100 and that in the first embodiment are explained with reference to flowcharts in FIG. 15. Since the processing in S1401 and the processing in S1411 of FIG. 15 are the same with that in S1201 and that in S1211 to S1223 of FIG. 13 in the first embodiment, a description of the differences is given. The CPU 201 loads the document management application 400, the virtual device application 410, printer driver, or the like that are stored in the ROM 204 or the external memory 206 into the ROM and executes them to thereby realize each processing flow. Also, unless otherwise stated, the document management application 400 and the virtual device application 410 of the third embodiment are the same with those in the first embodiment.

In the case where the printer driver registered in the document management application is automatically registered with the virtual device object, the deregistration processing of the relevant driver is performed after the handover processing of the settings for printout (S1401). That is, the output function management unit 407 accepts selection by a user via the UI the UI input management unit 403 as to whether or not the relevant driver is deregistered (S1402).

When an accepted selection indicates that the relevant driver has been deregistered S1402, the output function management unit 407 deregisters the driver, and deletes the pertinent icon from the output destination icon display area (S1403). In the case where the fax driver registered in the document management application is automatically registered with the virtual device object, the deregistration processing of the fax driver is performed after the handover processing of the settings for fax transmission (S1401). The deregistration processing of the pertinent driver (S1412 and S1413) is the same as that for the printer driver, and a description thereof is omitted.

Also, in the aforementioned example, the deregistration processing of the pertinent driver is determined due to the accepting of a user input in the determination processing in S1402. However, the automatic determination is available by using preregistered information. In that case, the output function management unit 407 determines whether or not to deregister the relevant driver according to the preregistered information (S1402).

With the above processing, the information processing device according to the present invention automatically registers the output function of the document management application that is the first application with the virtual device object that is generated by the virtual device application that is the second application. After handover of the setting information, the information processing device can deregister the unnecessary output function in the document management application automatically or by selection by a user. Naturally, after the output function registered with the virtual device object is registered with the document application, the information processing device can deregister the unnecessary output function in the virtual device object automatically or by selection by a user. In other words, the CPU 201 of the information processing device deregisters the driver registered with the handover source after handing over the driver from one application to the other application. Therefore, the work burden posed on a user can be further reduced when generating the virtual device object.

(Fourth Embodiment)

In the first embodiment, an example is described in which the information processing device according to the present invention automatically registers output functions with the virtual device object generated by the virtual device application when a user selects the output functions registered with the document management application. At that time, the information processing device searches for a driver having a selected function as well as the drivers having different functions that target the same device, and instructs the virtual device application to generate the virtual device object by using the retrieved drivers and to register the driver with the generated virtual device object. In the fourth embodiment, the information processing device instructs the virtual device application to generate the virtual device object and to register the driver as well as instructing the document management application to register the driver when the retrieved driver is unregistered with the document management application.

Hereinafter, differences between the processing by the information processing device 100 and that in the first embodiment are explained with reference to flowcharts in FIG. 16 and FIG. 17. Since the processing from S1501 to S1520 in FIG. 16 is the same as the processing from S1001 to S1020 in FIG. 10 in the first embodiment, a description of the differences is given. The CPU 201 loads the document management application 400, the virtual device application 410, printer driver, or the like that are stored in the ROM 204 or the external memory 206 into the ROM and executes them to realize thereby each processing flow. Also, unless otherwise stated, configurations of the document management application 400 and the virtual device application 410 in the fourth embodiment are the same with those in the first embodiment.

After the processing in S1512 or S1520, the application control unit 401 of the document management application implements processing for registering the driver which the application control unit 401 has instructed the virtual device application 410 to register (S1521, S1522). The details are given with reference to a flowchart in FIG. 17.

The application control unit 401 of the document management application of the virtual device application 410 determines whether or not the driver for which registration has been instructed has already been registered with the document management application (S1601). The case where the driver is unregistered in S1601 means that the driver has been retrieved from among the drivers registered with the OS. Hence, the output function management unit 407 hands over a device image registered with the OS as an icon (S1602). Next, the output function management unit 407 registers the target driver, and displays the icon on the output destination icon display area via the screen display management unit 402 (S1603).

With the above processing, the retrieved driver can be registered with the automatically generated virtual device object as well as being automatically registered with the document management application in the case that the driver is unregistered. Therefore, registration of the driver with the virtual device object and registration of the driver with the document management application can be performed at one time, resulting in reduction of the work burden posed on a user.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-252384 filed Nov. 16, 2012, which is hereby incorporated by reference herein in its entirety.

What is claimed is:

1. An information processing device comprising:
a creation unit configured to create a virtual device object corresponding to a driver under control of a second application by using a first application in which a first driver corresponding to an image processing device is selectable;
a display unit configured to display the created virtual device object;
a handover unit configured to extract the first driver selected by a user with the first application and to hand over the first driver to the second application;
a registration unit configured to register the first driver which the handover unit hands over with the virtual device object by using the second application; and
an output unit configured to output a file by using the first driver which the registering unit has registered with the virtual device object when the user selects the virtual device object by using the file.

2. The information processing device according to claim 1, wherein the handover unit extracts a second driver corresponding to a function of the image processing device that corresponds to the first driver, after handing over the first driver which the registration unit has registered to the second application, and hands over the extracted second driver to the second application.

3. The information processing device according to claim 2, wherein the handover unit extracts one or more drivers in which a same network address as that set in the first driver is set, and further extracts, from among the extracted drivers, a driver of which a function is different from a function of the first driver as the second driver.

4. The information processing device according to claim 2, wherein the handover unit extracts, from among drivers registered with an operating system in the information processing device, one or more drivers in which a same network address as that set in the first driver is set when the one or more drivers in which the same network address as that set in the first driver is set are not extracted from among drivers registered with the first application, and further extracts, from among the extracted drivers, the one or more drivers of which a function is different from a function of the first driver as the second driver.

5. The information processing device according to claim 1, wherein the creation unit displays, by using the first application, a first screen which includes at least an icon representing the image processing device and which has an operation area for a creation instruction of the virtual device object corresponding to the image processing device,
  wherein, the creation unit inquires and confirms, to the first driver, a function of the first driver in which a network address of the image processing device represented by the icon is set when the icon contained in the operation area is selected, and
  wherein, when a confirmed function of the first driver is the same as a predetermined function, the creation unit determines that the virtual device object of the image processing device represented by the icon can be created and displays operation items for the creation instruction of the virtual device object.

6. The information processing device according to claim 5, wherein the display unit displays the created virtual device object on a second screen provided in the information processing device,
  wherein, due to detecting that the virtual device object displayed on the second screen has been dragged and dropped on the first screen, the handover unit extracts one or more drivers registered with the virtual device object dropped on the first screen, and
  wherein the handover unit determines whether or not the extracted one or more drivers have already registered with the first application, and hands over the extracted one or more drivers to the first application when the extracted one or more drivers are unregistered.

7. The information processing device according to claim 6, wherein the creation unit further displays the icon representing the image processing device corresponding to the virtual device object on the operation area of the first screen when the one or more drivers registered with the virtual device object dropped on the first screen are handed over to the first application.

8. The information processing device according to claim 1, further comprising a deregistration unit configured to deregister a driver registered with the first application or the second application,
  wherein the deregistration unit deregisters the driver registered with the first application or the second application from a registration source after the handover unit hands over the driver registered with the first application or the second application from either the first application or the second application to each other.

9. The information processing device according to claim 1, wherein the first driver corresponds to a function executed by the image processing device, and includes at least a printer driver or a fax driver.

10. A method for controlling an information processing device, the method comprising:
  creating a virtual device object corresponding to a driver under control of a second application by using a first application in which a first driver corresponding to an image processing device is selectable;
  displaying the created virtual device object;
  extracting the first driver selected by a user with the first application so as to hand over the first driver to the second application;
  registering the first driver which the extracting has handed over with the virtual device object by using the second application; and
  outputting a file by using the first driver which the registering has registered with the virtual device object when the user selects the virtual device object by using the file.

11. The method according to claim 10, wherein the extracting extracts a second driver corresponding to a function of the image processing device that corresponds to the first driver, after having handed over the first driver which the registering has registered to the second application, and hands over the extracted second driver to the second application.

12. The method according to claim 11, wherein the extracting extracts one or more drivers in which a same network address as that set in the first driver is set, and further extracts, from among the extracted drivers, a driver of which a function is different from a function of the first driver as the second driver.

13. The method according to claim 11, wherein the extracting extracts, from among drivers registered with an operating system in the information processing device, one or more drivers in which a same network address as that set in the first driver is set when the one or more drivers in which the same network address as that set in the first driver is set are not extracted from among drivers registered with the first application, and further extracts, from among the extracted drivers, the one or more drivers of which a function is different from a function of the first driver as the second driver.

14. The method according to claim 10, wherein the creating displays, by using the first application, a first screen which includes at least an icon representing the image processing device and which has an operation area for a creation instruction of the virtual device object corresponding to the image processing device,
  wherein, the creating inquires and confirms, to the first driver, a function of the first driver in which a network address of the image processing device represented by the icon is set when the icon contained in the operation area is selected, and
  wherein, when a confirmed function of the first driver is the same as a predetermined function, the creating determines that the virtual device object of the image processing device represented by the icon can be created and displays operation items for the creation instruction of the virtual device object.

15. The method according to claim 14, wherein the displaying displays the created virtual device object on a second screen provided in the information processing device,
  wherein, due to detecting that the virtual device object displayed on the second screen has been dragged and dropped on the first screen, one or more drivers registered with the virtual device object dropped on the first screen are extracted, and
  wherein the extracting determines whether or not the extracted one or more drivers have already registered with the first application, and hands over the extracted one or more drivers to the first application when the extracted one or more drivers are unregistered.

16. The method according to claim 15, wherein the creating further displays the icon representing the image processing device corresponding to the virtual device object on the operation area of the first screen when the one or more drivers registered with the virtual device object dropped on the first screen are handed over to the first application.

17. The method according to claim 10 further comprising deregistering a driver registered with the first application or the second application,
   wherein the deregistering deregisters the driver registered with the first application or the second application from a registration source after the extracting hands over the driver registered with the first application or the second application from either the first application or the second application to each other.

18. The method according to claim 10, wherein the first driver corresponds to a function executed by the image processing device, and includes at least a printer driver or a fax driver.

19. A non-transitory storage medium on which is stored a computer program for making a computer execute a method comprising:
   creating a virtual device object corresponding to a driver under control of a second application by using a first application in which a first driver corresponding to an image processing device is selectable;
   displaying the created virtual device object;
   extracting the first driver selected by a user with the first application so as to hand over the first driver to the second application;
   registering the first driver which the extracting has handed over with the virtual device object by using the second application; and
   outputting a file by using the first driver which the registering has registered with the virtual device object when the user selects the virtual device object by using the file.

\* \* \* \* \*